United States Patent [19]
Skrobisch

[11] 3,886,545

[45] May 27, 1975

[54] SEGMENTAL READOUT DEVICE HAVING IMPROVED MAGNETIC CIRCUIT COMPONENTS

[75] Inventor: Alfred Skrobisch, Huntington Station, N.Y.

[73] Assignee: The Staver Company, Incorporated, Bay Shore, N.Y.

[22] Filed: Nov. 12, 1973

[21] Appl. No.: 414,749

[52] U.S. Cl. .............. 340/373; 340/336; 340/378 R

[51] Int. Cl. .............................................. G08b 5/26

[58] Field of Search ................. 340/373, 336, 378 R

[56] References Cited

UNITED STATES PATENTS

| | | | |
|---|---|---|---|
| 3,469,258 | 9/1969 | Winrow | 340/373 |
| 3,623,084 | 11/1971 | McCormick | 340/373 X |
| 3,634,857 | 1/1972 | Pihl | 340/373 |

*Primary Examiner*—Harold I. Pitts

[57] ABSTRACT

A segmental readout device includes a support plate carrying seven rotatable magnetized indicator members in a spaced array adjacent to a front plate having openings to expose the indicator members. A magnetic back plate has forwardly extending magnetic cores integrally formed with the back plate and carrying cylindrical electromagnetic coils for actuating the indicator members. One group of lateral magnets in the array has diametrically opposite poles oriented oppositely from similar poles of another group of centered magnets. Coils associated with the lateral magnets are oppositely wound from the coils associated with the centered magnets. Rotational axes of the lateral magnets are perpendicular to the axes of the centered magnets. The orientation of the axes and poles winding of the coils effectively isolates adjacent magnetic circuits from each other so that it limits the ability of one magnet to cause rotation of any other magnet.

9 Claims, 10 Drawing Figures

SEGMENTAL READOUT DEVICE HAVING IMPROVED MAGNETIC CIRCUIT COMPONENTS

This invention relates to a segmental readout device and more particularly is concerned with a readout device of the digital or alphanumeric type in which magnetic elements are employed as parts of the segmental readout display members.

The present invention involves improvements over the device described in my U.S. Pat. No. 3,668,700. The invention particularly involves improvements in magnetic circuit components of the magnetic readout display members, and in the way they are magnetized.

In the readout devices of my prior patents, and particularly U.S. Pat. No. 3,668,700, the electromagnetic coils which actuate the rotatable segmental readout members are mounted on cores which are individually bolted to a magnetic back or base plate. The rotatable readout members rotate loosely in apertures formed in a non-magnetic plastic front plate. The readout members or segments are disposed in an "8" shaped array to define numerals when selected groups of the segments are exposed in the front plate.

In the present invention each of the rotatable readout members is carried on an insulative or nonmagnetic support plate spaced rearwardly of a front plate having elongated openings or apertures, at which the readout members are exposed. These openings or apertures are disposed in an "8" shaped array. The support plate slidably engages ends of the magnetic cores of the electromagnetic coils, which are integral with a magnetic back or base plate. Two spacers or rods of nonmagnetic material are mounted to the back plate and carry nonmagnetic sleeves which space the front plate from the inner support plate. Each rotatable segmental readout member includes a bipolar permanent magnet and a cylindrical nonmagnetic element. The nonmagnetic element carries a vane which serves as a segmental indicating member. Both rotatable magnet and nonmagnetic element are carried by a pin rotatably engaged in slotted flanges integral with the nonmagnetic support plate. Stop pins carried by the nonmagnetic element limit rotation of the rotatable readout member. The lateral magnets at opposite sides of the 8 shaped array rotate on vertically oriented, axially aligned and spaced pins, and are magnetized in the same way with diametrically opposite N and S poles. The centered magnets located between the lateral magnets rotate on horizontally oriented axes perpendicular to the vertically oriented axes of the lateral magnets and are magnetized with a polarity opposite to that of the lateral magnets to magnetically isolate them from the lateral magnets, and thus prevent rotation of the centered magnets when the lateral magnets rotate and vice versa.

It is therefore a principal object of the present invention to provide a segmental readout device which may have a low cost of manufacture and a high degree of reliability in performance.

It is another object of the present invention to provide a segmental readout device which has readout segments disposed in a "8" shaped array and wherein the rotation of one segment does not cause any rotation of any other segment.

It is still another object of the present invention to provide a segmental readout device of the character described wherein each of the segments include a bipolar magnetizable element and wherein the centered magnetic elements of the array located between the lateral magnetic elements of the array are magnetized with opposite polarities to isolate adjacent magnetic circuits.

These and other objects and many of the attendant advantages of this invention will be readily appreciated as the same becomes better understood by reference to the following detailed description when considered in connection with the accompanying drawings in which.

Figures 1, 2, 3, 4, 5, 7, 8:
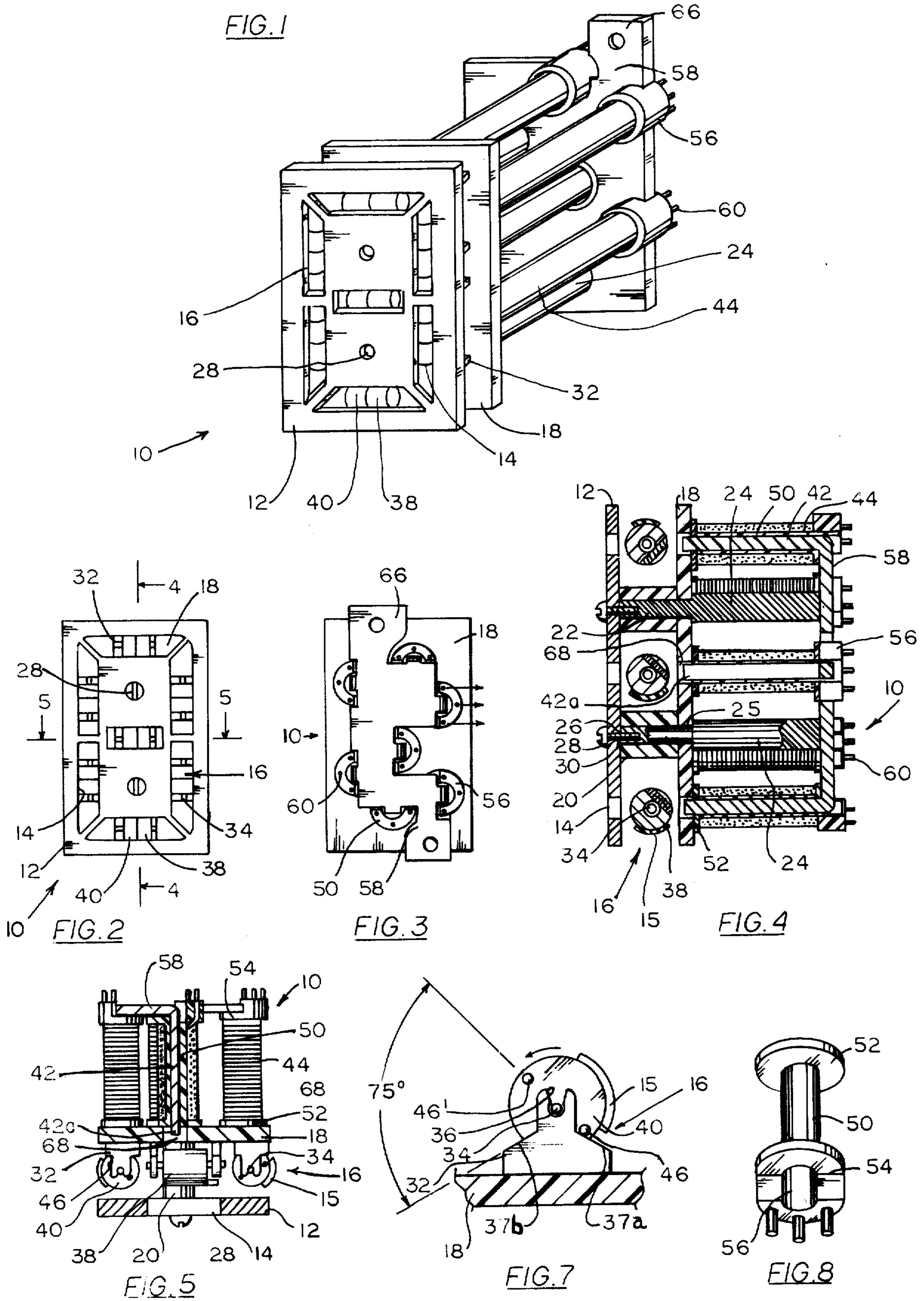
FIG. 1 is a perspective view of a readout device embodying the present invention.
FIG. 2 is a front elevational view thereof.
FIG. 3 is a rear elevational view thereof.
FIG. 4 is an enlarged central vertical sectional view taken along line 4—4 of FIG. 2.
FIG. 5 is an enlarged central horizontal sectional view taken along 5—5 of FIG. 2.
FIG. 7 is an enlarged fragmentary sectional view through the support plate showing details of a rotatable segmental readout member and support means.
FIG. 8 is a perspective view of a spool employed for an electromagnetic coil.

Referring now to the drawings wherein like reference characters designate like or corresponding parts throughout, there is illustrated in FIG. 1 through 6 a segmental readout device generally designated as reference numeral 10 and which includes a rectangular front plate 12 having seven elongated openings. At each of the openings 14, which serve as windows, there is exposed an elongated flag 15, carried by a rotatable readout member 16. The openings 14 are arranged in a conventional numeral 8 formation so that any desired digit from 0 to 9 may be exposed by selectively displaying certain ones of the flags which may be colored or painted with a color which constrasts with the other parts of the structure.

A rectangular support plate 18 made of a plastic or nonmagnetic metal is spaced rearwardly from the front window plate 12 by two cylindrical nonmagnetic sleeve elements 20 carried on a narrow cylindrical extension 22 of a cylindrical nonmagnetic spacer 24. Each of the extensions 22 extends through a spaced hole 25 in the plate 18 and has a threaded hole 26 in its end for engaging a screw 28 which protrudes through a spaced hole 30 in the front window plate 12.

The support plate 18 is provided at its front side with seven integral pairs of slotted flanges 32. As best shown in FIG. 7, ends of a central pin 34 of each of the rotatable readout members 16 are rotatably engaged in a slot 36 having fingers 37a and 37b formed in each one of the flanges 32. Each readout member includes a magnet 38 having an N polarity 38' and an S "polarity 38". The magnet 38 is secured by conventional means into a cylindrical or nonmagnetic disk 39 which is secured on the pin 34 along with a nonmagnetic metal or plastic disk 40 onto which is secured the vane 15. In FIGS. 1, 2, 4 and 5 the vanes 15 are shown turned away from the window openings 14. They are held in this position by magnetic attraction between the magnet 38' or 38'' and an adjacent end of a magnetic core 42 of a coil 44. Each of the nonmagnetic disks 40 carries two spaced pins 46, 46' which serve to limit rotation of the rotatable readout member 16 to approximately 75° by lateral abutment of either the pin 46 or 46' with one of the shoulders 37*a*, 37*b* of the supporting flanges 32, see FIG. 7.

Each of the coils 44 is wound on a nonmagnetic or plastic spool 50 as best shown in FIG. 8. Each of the spools 50 has annular flanges 52, 54 at opposite ends. Each of the flanges 54 has a semicylindrical extension 56 for engaging an edge of a magnetic back plate 58, see FIGS. 1, 3–7. Three terminal pins 60 extend rearwardly of the flange extension 56. The opposite ends 101 and 109 and a centertap 106 of each of the coils 44 are connected to pins 60 in an actuating circuit such as circuit 100 shown diagramatically in FIG. 9.

Figure 6:
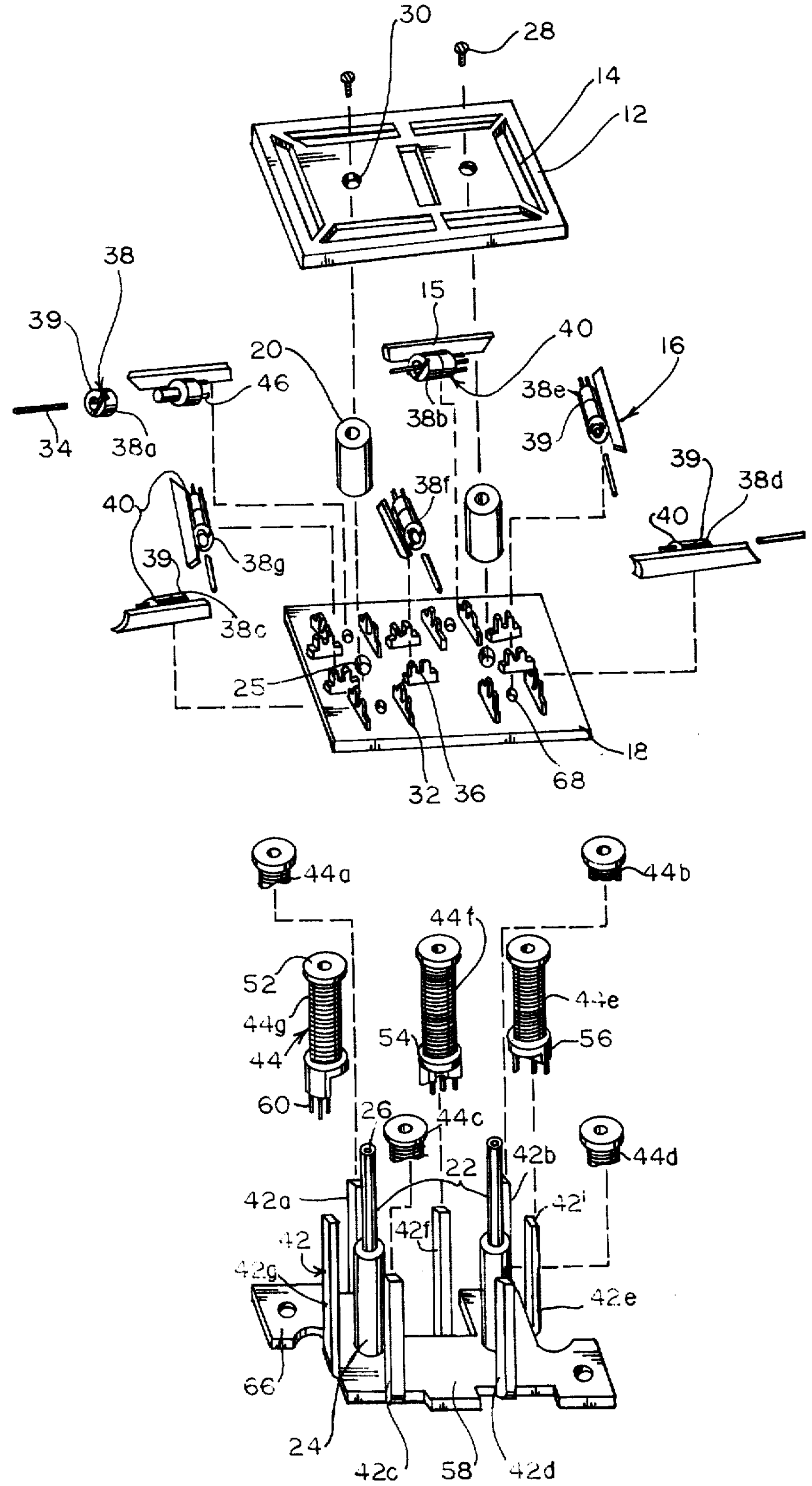
FIG. 6 is an exploded perspective view of components of the device.
Figure 10:
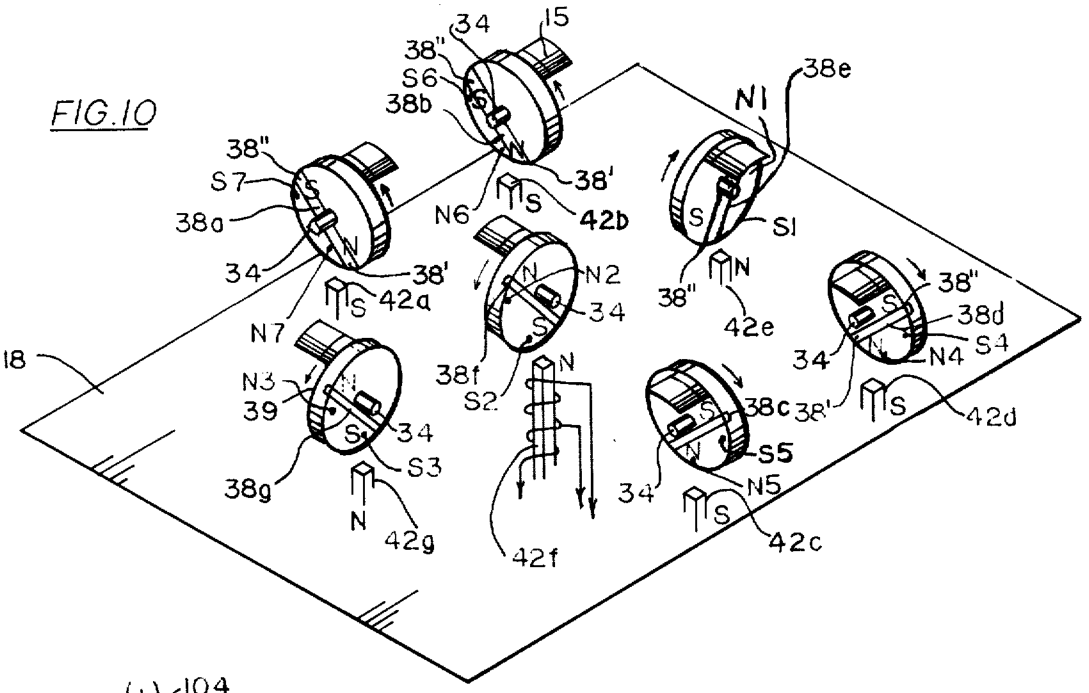
FIG. 10 is a perspective view partially diagrammatic in form of the segmental readout members.

The magnetic cores 42 individually designated 42a-42g in FIGS. 6 and 10 are integrally formed with the magnetic back or base plate 58 as clearly shown in FIGS. 4, 5 and 6. Also integral with the plate 58 and secured by riveting or otherwise are the two cylindrical spacers 24 which serve to support the front plate 12 and the sleeve elements 20. The plate 58 has two apertured end flanges 66 adjusted to be engaged by bolts for mounting the entire readout device on a suitable support. It will be noted as best shown in FIGS. 4 and 5 that each of the free ends 42*a* of the magnetic cores 42 extend into a respective hole 68 formed in the support plate 18. Each of the holes 68 is located between a pair of the flanges 32, so that each of the cores 42 terminates adjacent to the periphery of the disk 39 which contains the magnets 38' and 38''.

As mentioned hereinbefore each of the magnets 38 has diametrically opposed N pole 38' and S pole 38''. When a core 42 is magnetized by energizing a coil 44 with direct current applied via pins 60, the magnet 38 rotates by attraction or repulsion between one pole and the magnetized end of the core 42. One of the pins 46 engages one of the shoulders 37*a* when the vane 15 is turned away from the window 14 to clear the associated window. When the associated magnet 38 rotates its travel is limited to about 75° as indicated in FIG. 7 when the stop pin 46' laterally abuts the shoulder 37*b*. This positions the associated vane 15 in the adjacent window opening 14. When the associated coil 44 is deenergized the magnet and its rotor remain in the position just reached since it is a magnetically stable position. When the associated coil 44 is energized by current of oppositely polarity, as will be explained in connection with FIGS. 9 and 10, the readout member 16 rotates to turn the vane 15 away from the window 14 in which it is exposed, until the stop 46 again contacts the abutment flange of shoulder 37*a*.

Figure 9:
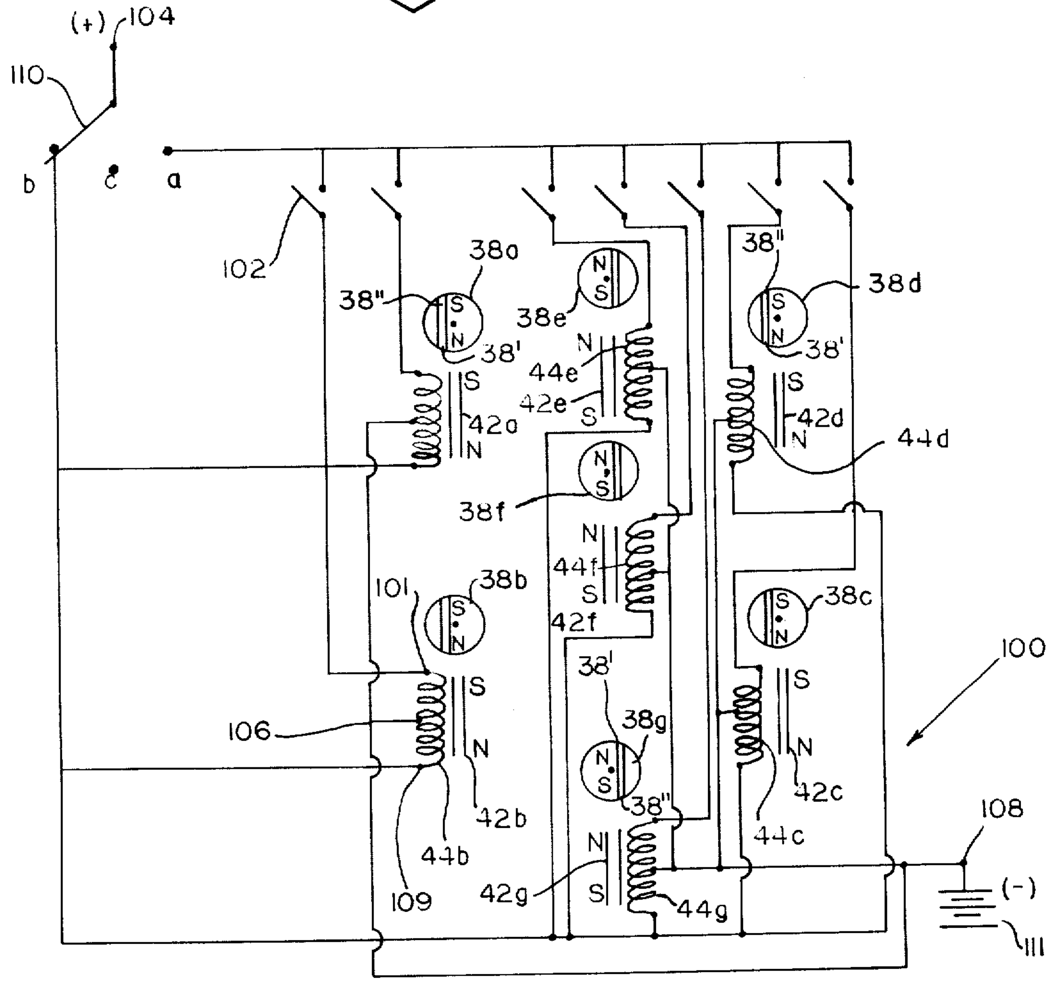
FIG. 9 is a diagram of an actuating circuit for the readout device.

The magnetic cores 42 are individually designated 42*a*–42*g* in FIGS. 6, 9 and 10. The lateral cores forming one group are designated 42*a*–42*d* and the centered cores 42 form another group and are designated 42*e*–42*g*. Similarly for the groups of the coils 44 on the cores 42, the lateral coils are designated 44*a*–44*d* and the centered coils are designated 44*e*–44*g*. The associated magnets 38 are also grouped into laterally located magnets 38*a*–38*d* and centered magnets 38*e*–38*g*.

Each magnetic circuit includes the coil core 42, the magnet 38 and the rear magnetic plate 58 which is common to all magnetic circuits. The coils 44*a*, 44*b*, 44*c*, 44*d* are so wound that the respective end of the cores 42*a*, 42*b*, 42*c* and 42*d* protruding through the plate 18 develop the same polarity (S) poles as indicated in FIG. 10. The corresponding associated magnets 38*a*, 38*b*, 38*c* and 38*d* rotate on axially aligned and spaced parallel pins 34. Centered coils 44*e*, 44*f* and 44*g* are all wound alike, and oppositely to the coils 44*a*–44*d* so that the respective centered end of the cores 42*e*, 42*f* and 42*g* protruding through the plate 18 develop the same polarity (N poles) which are opposite in polarity to the (S) poles 42*a*–42*d*. The axes of rotation of centered magnets 38*e*, 38*f* and 38*g* are perpendicular to the axes of rotation of lateral magnets 38*a*–38*d*. The N pole 38' and the S pole 38' of the magnets 38*a*–38*d* are opposite to those of magnets 38*e*, 38*f* and 38*g*. In this configuration it has been found that the otherwise appreciable but undesirable interaction between the magnetic fields of the *a–d* group and those of the *e–g* group can be reduced to unimportance without the cost of special shielding between magnets.

FIG. 10 shows the orthogonal orientation of the rotational axes of the lateral magnets 38*a*–38*d* and centered magnets 38*e*–38*g*. Also shown are the identical polarities of lateral poles 42*a*–42*d* as contrasted with the opposite polarity of centered poles 42*e*–42*g*. When the magnets are caused to rotate to display a vane they turn clockwise or counterclockwise as indicated by the arrows in FIG. 10. They are limited to rotate about 75° to the N1–N7 and S1–S7 positions indicated.

FIG. 9 shows one circuit arrangement 100 for energizing the coils 44*a*–44*g* and actuating the magnets 38*a*–38*g*. One terminal 101 of each coil is connected via a switch 102 to a positive terminal 104 of a power supply via a terminal 110*a* of a three terminal switch 110. A center tap 106 of each coil is connected to a negative terminal 108 of a power supply 111. The coils 44*a*–44*d* are wound oppositely from the coils 44*e*–44*g*. An optional reset circuit is provided by connecting the other end of terminal 109 of each coil 44, to a positive terminal 104 of the power supply 111 via a terminal b of the switch 110. When any one switch 102 is opened the magnet remains in this stable position with no further current applied. To apply a resetting pulse to this magnet and, in fact, to reset all the 7 magnets at once, switch 110 is moved from position *a* to position *b*. This sends current into the second half of each coil, reversing core polarity and driving the magnet 38 back to its reset position. Switch 110*b* may now be opened by placing it in position c and all the magnets will remain reset with no further power input.

By positioning the magnets at or near a diameter of the rotor it is possible to energize a coil and drive a magnet around 60° or more and then, by simply deenergizing the coil, have the magnet return to its starting position with no reset current. This well known technique may be used where a "memory" or bi-stable device is not required or desired.

The entire assembly 10 is characterized by the relative simplicity of construction. The back plate 58 and the cores 42 may all be stamped out as a unit, and the support bars 24 may then be easily secured thereto, by welding in place, or if desired threaded into holes in the plate 58.

To assemble the readout device, the coils 44 are placed on the cores 42 and then the plate 18 is mounted on ends of the cores 42 and the support bar extensions 22. Then the cylindrical spacers 20 are placed on the bar extensions 20. The pins 34 of rotatable readout member 16 are engaged in the slots 36 of the flanges 32, and then the front plate 12 is mounted and secured by the screws 28. If desired the entire assembly may be enclosed in an outer casing (not shown). The casing may be provided with a transparent glass or plastic face plate through which the indicating segments may be seen.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A segmental readout device comprising:

a support plate;

seven rotatable indicator members rotatably supported by said support plate each of said indicator members comprising a permanent magnet, said indicator members being disposed in a Figure "8" spaced array with a group of lateral magnets rotating on axially spaced, parallel vertical axes and another group of centered magnets rotating on axially spaced parallel horizontal axes, each of said magnets having a N and a S pole, with the poles of said lateral magnets being oriented oppositely from the poles of said centered magnets for effectively reducing the magnetic effect of each of said magnets on all adjacent magnets;

a back plate carrying seven magnetic cores on said back plate and extending forwardly to said support plate;

a cylindrical electromagnetic coil mounted on each of said cores for selectively energizing and rotating said indicator members; and a front window plate supported by said support plate and forwardly thereof said front window plate having seven elongated openings for selectively exposing said indicator members thereat to indicate selected characters.

2. A segmental readout device as defined in claim 1, further comprising a pair of spacers mounted on said back plate and extending forwardly to said support plate to carry the same, said spacers having sleeves extending forwardly to said front window plate and engaging screws thereat to hold said front window plate and said support plate in fixed positions with respect to said back plate.

3. A segmental readout device as defined in claim 2, further comprising cylindrical spacer members on said bar extensions for fixing the spacing between said front window plate and said support plate.

4. A segmental readout device as defined in claim 1 further comprising a plurality of pairs of flanges integrally formed with and extending forwardly of said support plate toward the said front window plate, each of said indicator members having axial means rotatably engaging said flanges and supported thereby adjacent to said openings respectively in said front window plate.

5. A segmental readout device as defined in claim 4, wherein each of said indicator members further comprises a nonmagnetic cylindrical member abutting said magnet, and an elongated indicator flag secured to the periphery of said non-magnetic cylindrical member so that said flag is pivotable between two angularly spaced positions respectively aligned with and out of alignment with one of said openings.

6. A segmental readout device as defined in claim 5, wherein each nonmagnetic cylindrical member carries two spaced pins for respectively abutting one of said flanges in each of said two positions of said indicator flag to hold said indicator members in each of said two positions.

7. A segmental readout device as defined in claim 6, wherein each of said electromagnetic coils is wound on a spool having an annular rear end formed with a semicylindrical extension for abutting an edge of said back plate and holding said coil non-rotatably between said support plate and said back plate on said magnetic core.

8. A segmental readout device as defined in claim 7, wherein each of said semicylindrical extension of said spool carries terminal pins connected to said coil carried by said spool for conducting electric current through said coil.

9. A segmental readout device as defined in claim 8, wherein one group of said coils is associated with said one group of lateral magnets and another group of said coils is associated with the other group of centered magnets, the winding of said coils of said one group being opposite from the winding of said coils of said other group, so that the magnetic fields established by energizing said coils shows a lessened repulsive effect on each other whereby rotation of any of said magnets in any direction will not cause rotation of any other magnet.

* * * * *